US006866773B2

(12) United States Patent
Margovsky et al.

(10) Patent No.: US 6,866,773 B2
(45) Date of Patent: Mar. 15, 2005

(54) FILTRATION CARTRIDGE

(76) Inventors: Konstantin E. Margovsky, 310 County Rd. MM, Brooklyn, WI (US) 53521; Jack Trebnio, 5109 Hammersley Rd., Madison, WI (US) 53711

( * ) Notice: Subject to any disclaimer, the term of this patent is extended or adjusted under 35 U.S.C. 154(b) by 144 days.

(21) Appl. No.: 10/274,475

(22) Filed: Oct. 21, 2002

(65) Prior Publication Data

US 2004/0074830 A1 Apr. 22, 2004

(51) Int. Cl.$^7$ .................................................. C02F 3/10
(52) U.S. Cl. ........................ 210/169; 210/447; 210/484
(58) Field of Search ................................ 210/169, 447, 210/484, 615

(56) References Cited

U.S. PATENT DOCUMENTS 3,513,978 A * 5/1970 Newsteder ................... 210/169
5,053,125 A * 10/1991 Willinger et al. ........... 210/169

* cited by examiner

Primary Examiner—Robert A. Hopkins

(57) ABSTRACT

A filtration cartridge, for purifying biologically contaminated liquids, comprised of a framework having a plurality of voids and abundant surface area extensions and forming a cavity(s) for insertion of filtration materials. The cartridge framework is permanent and its surface area provides colonization sites for the propagation of water purifying microorganisms responsible for biological filtration. The cavity(s) accepts filter media that add additional functions such as mechanical and/or chemical filtration or other media that enrich or modify the chemical composition of the liquid being treated.

2 Claims, 4 Drawing Sheets

FILTRATION CARTRIDGE

STATEMENT REGARDING FEDERALLY SPONSORED RESEARCH OR DEVELOPMENT

Not Applicable

REFERENCE TO SEQUENCE LISTING, A TABLE, OR COMPUTER PROGRAM LISTING COMPACT DISK APPENDIX

Not Applicable

BACKGROUND OF THE INVENTION

This invention relates to the field of devices for filtering and treating aqueous solutions in a wide range of applications. In particular, the present invention relates to filtration cartridges, which employ combination of porous materials for mechanical filtration and granulated activated carbon as a chemical absorbent. Such filtration cartridges are typically used in the field of aquarium filters and filtering equipment. In aquarium settings the water from the aquarium is drawn through a filtration cartridge placed into a container by means of a water pump and then returned to the aquarium.

A filter cartridge is shown in U.S. Pat. No. 4,483,769 to Sherman, U.S. Pat. No. 5,053,125 to Willinger, et al., and U.S. Pat. No. 5,728,293 to Guoli, et al.

The Sherman device uses a back stiffener structure with plurality of slots for water passage and channels filled with granulated activated carbon. A porous filter material is secured to the front of the structure to cover the channels. The water flows through the porous material to the carbon, through the carbon, and then through the back structure slots returns to the aquarium. At some point of time this type of filtration cartridge becomes clogged and must therefore be removed and replaced. The newly replaced filtration cartridge is free of microorganisms while the old filtration cartridge with microorganisms is discarded. This creates a void in filtering ability until the microorganisms re-establish themselves in the replaced filtration cartridge. Additionally, since the filtration cartridges of this type are entirely sealed, the amount of carbon or other type of chemical reagent in the cartridge cannot be individually adjusted.

The Willinger, et al. filter uses a framework within a disposable filter bag that is filled with carbon. In vertical installations this type of filtration cartridge usually accumulates the carbon in the lower portion of the cartridge. Upon clogging the water flows through the top portion of the cartridge, thus bypassing the carbon, which in turn results in lack of chemical filtration. The framework limited surface area does not support colony of microorganisms sufficient to provide for the uninterrupted level of biological filtration once the old filter bag is being replaced with a new one.

The Guoli, et al. filter uses a separate planar framework with plural groups of vanes projecting from one side of the plate for promoting biological filtration. A separate disposable unit with its own framework similar to the one of Sherman's device must be used in addition with the plate. Thus the filtration employs two separate cartridges to achieve mechanical, chemical and uninterrupted biological filtrations. In addition since the disposable units of this type are entirely sealed, the amount of carbon or other type of chemical reagent in the cartridge cannot be individually adjusted.

BRIEF SUMMARY OF THE INVENTION

The filtration cartridge of the invention provides a permanent framework with abundant surface area extensions and a cavity or series of cavities for insertion of various types of filtration or treatment media for the purpose of purifying or treating of biologically contaminated aqueous solutions. The framework's large surface area provides a substrate for the growth and propagation of microorganisms. The permanent nature of the framework allows for the stable long-term culture of microorganisms that leads to uninterrupted biological filtration.

The cartridge framework further forms a cavity or series of cavities for insertion of various types of filtration or treatment media. Such media may consist of a variety of none woven or filamentary synthetic or natural fibrous materials, inert porous natural minerals, etc. Being inserted into a cavity(s) of the cartridge framework, the media provides for mechanical filtration of the aqueous solutions treated by the filter by retaining the solid waste and contaminants.

The filtration or treatment media can be furthermore impregnated with a wide variety of ingredients for chemical absorption of pollutants presented in the aqueous solutions. The impregnation with active carbon, for instance, dramatically increases absorption capacity as it allows use of powdered carbon with tremendous surface area of carbon particles in comparison with palletized or granulated forms.

The filtration or treatment media can be furthermore impregnated with a wide variety of trace elements, vitamins and other organic and none organic compounds essential for creating enriched aqueous environment in specific applications.

The filtration or treatment media can be furthermore impregnated with a wide variety of ingredients for medical treatment of aqueous environment inhabitants.

The separation of biological filtration functions of the cartridge from all other functions such as mechanical and/or chemical filtration allows for customization of the cartridge to specific treatment needs.

The filtration cartridge of the invention can be used in any filtering device that causes a flow of the aqueous solution through the filtration cartridge.

BRIEF DESCRIPTION OF THE SEVERAL VIEWS OF THE DRAWINGS

The invention is described with reference to the design of the SC-5 model shown on the following drawings, in which.

DETAILED DESCRIPTION OF THE INVENTION

The following description is of the currently designed model carrying out the invention. This description is for the illustrative purposes only and is not to be perceived in a limiting sense.

Figure 1:
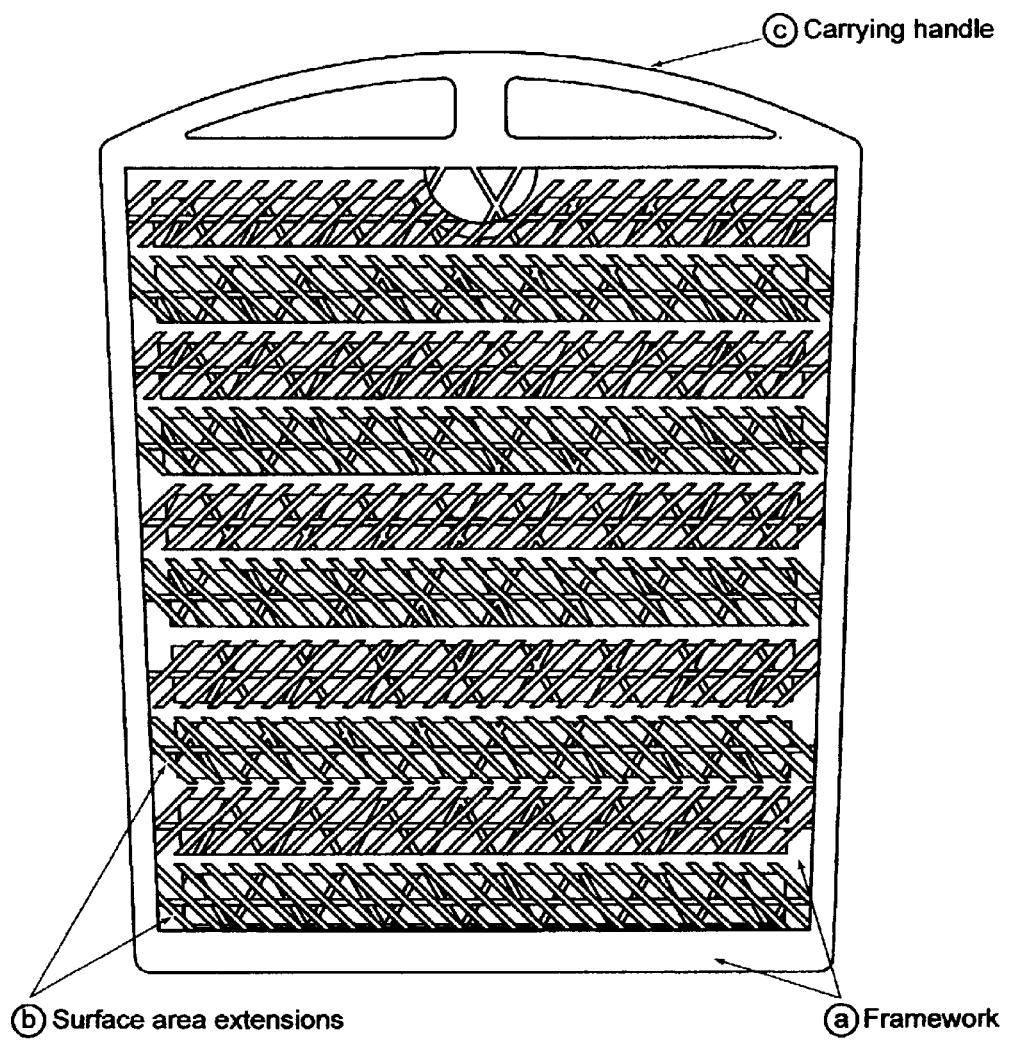
FIG. 1 is a front plan view of the SC-5 model using the filtration cartridge concept of the invention.
Figure 2:
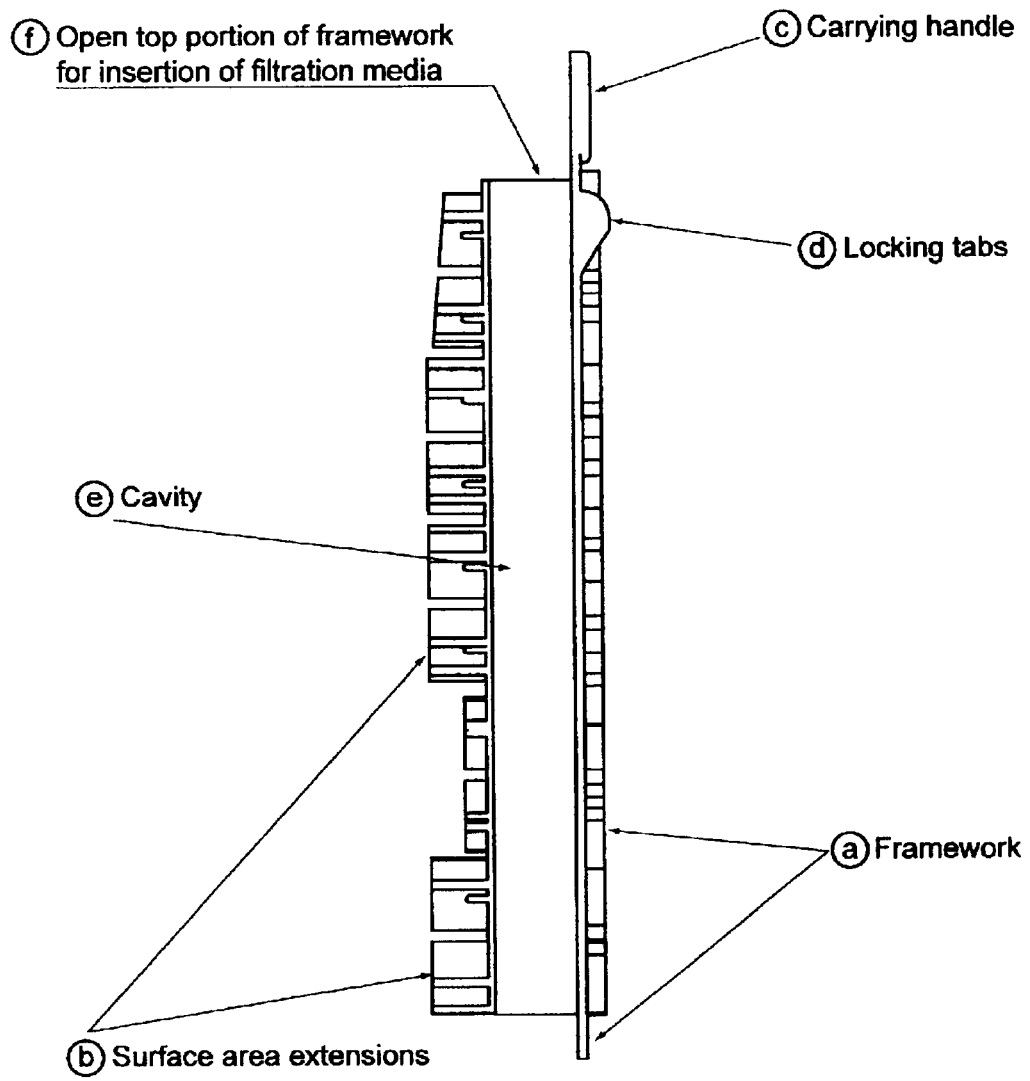
FIG. 2 is a side plan view of the SC-5 model using the filtration cartridge concept of the invention.
Figure 3:
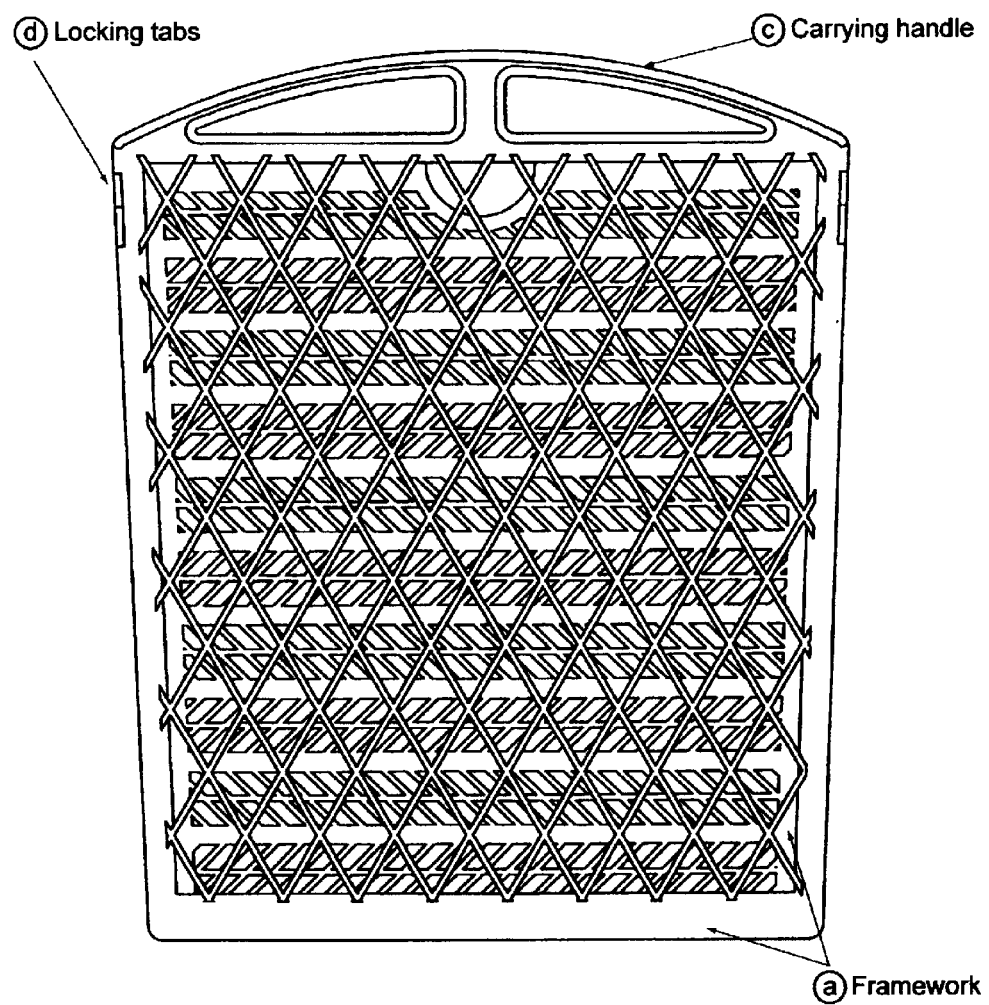
FIG. 3 is a back plan view of the SC-5 model using the filtration cartridge concept of the invention.
Figure 4:
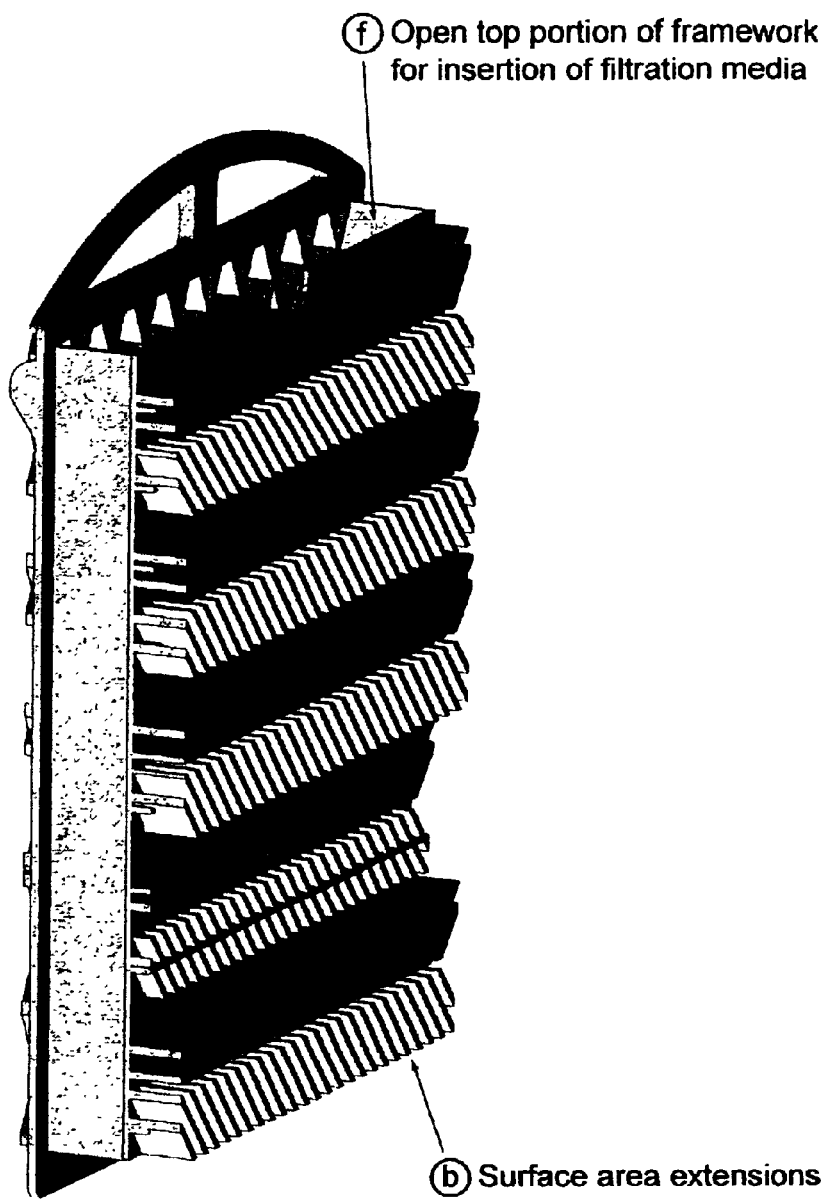
FIG. 4 is a perspective view of the SC-5 model using the filtration cartridge concept of the invention.

Referring to FIGS. 1, 2 and 3 there is shown the filtration cartridge model SC-5 of the invention. The cartridge includes the framework (a) with surface area extensions (b), carrying handle (c), locking tabs (d), cavity (e), and open top portion of framework for insertion of filtration media (f).

Cartridge framework with elements is molded from any suitable materials in a matter to be structurally sound to form the cavity (e) and provide support for the surface area extensions (b). The locking tabs (d) on both sides of the cartridge framework serve for securing the cartridge in place in this specific design application.

The cavity (e) is formed as an integral element of the cartridge framework and serves the purpose of housing filtration and/or treatment media. In the specific application shown, the filtration media is inserted into the cavity from the open top portion of the framework (f).

In the preferred embodiment the cartridge is placed inside a filtration device in such a manner that the aqueous solution being treated constantly passes through the cartridge. With time the abundant surface area extensions of the cartridge framework become colonized by microorganisms, which provide biological filtration. A filtration media inserted into the cartridge framework cavity is impregnated with powdered activated carbon and thus provides for secondary—mechanical and tertiary—chemical filtration.

In summary, it is seen that a filtration cartridge based on the present invention combines three types of filtration in a single unit by providing uninterrupted high-level biological filtration, effective chemical and mechanical filtration.

What is claimed is:

1. A filtration cartridge for use in an aquarium, the cartridge comprising a cartridge framework formed to define a cavity which is open to the top of the framework and adapted so that a filtration media can be placed inside of the cavity, the framework formed so that liquid can flow through media placed in the cavity;

surface area extensions formed on a side of the framework extending outward therefrom to increase the surface area of the framework exposed to the liquid passing through the filtration cartridge, the surface areas extensions adapted to colonization by microorganisms to increase the biological filtration provided by the filtration cartridge; and locking tabs which may be used to lock the cartridge in place inside of another device.

2. A filtration cartridge for use in an aquarium, the cartridge comprising a cartridge framework molded as a unit and formed to surround an interior cavity which is open to the top of the framework and adapted for the placement of a physical filtration media inside of the cavity, the framework formed so that liquid can flow through media placed in the cavity; and surface area extensions formed on a side of the framework extending outward therefrom to increase the surface area of the framework exposed to the liquid passing through the filtration cartridge, the surface area extension formed as rows of extensions extending outwardly from the framework, the surface areas extensions adapted to colonization by microorganisms to increase the biological filtration provided by the filtration cartridge.

\* \* \* \* \*